(12) United States Patent
Chen et al.

(10) Patent No.: US 9,467,632 B1
(45) Date of Patent: Oct. 11, 2016

(54) DUAL EXPOSURE CONTROL CIRCUIT AND ASSOCIATED METHOD

(71) Applicant: Himax Imaging Limited, Tainan (TW)

(72) Inventors: Po-Chang Chen, Tainan (TW);
Yuan-Chih Peng, Tainan (TW);
Po-Fang Chen, Tainan (TW)

(73) Assignee: Himax Imaging Limited, Tainan (TW)

( * ) Notice: Subject to any disclaimer, the term of this patent is extended or adjusted under 35 U.S.C. 154(b) by 0 days.

(21) Appl. No.: 14/797,185

(22) Filed: Jul. 13, 2015

(51) Int. Cl.
| H04N 5/225 | (2006.01) |
| H04N 5/235 | (2006.01) |
| H04N 5/351 | (2011.01) |

(52) U.S. Cl.
CPC ................................ *H04N 5/351* (2013.01)

(58) Field of Classification Search
CPC ....... H04N 5/225; H04N 5/315; H04N 5/235
See application file for complete search history.

(56) References Cited

U.S. PATENT DOCUMENTS

| 2003/0081117 A1* | 5/2003 | Bogdanowicz ........ H04N 5/253 348/97 |
| 2006/0164533 A1* | 7/2006 | Hsieh ................ H01L 27/14632 348/317 |
| 2014/0267828 A1 | 9/2014 | Kasai |
| 2014/0347521 A1 | 11/2014 | Hasinoff |
| 2015/0172617 A1 | 6/2015 | Kitajima |

FOREIGN PATENT DOCUMENTS

| TW | 201440520 A | 10/2014 |
| TW | 201513664 A | 4/2015 |
| TW | 201515466 A | 4/2015 |

* cited by examiner

*Primary Examiner* — Tuan Ho
(74) *Attorney, Agent, or Firm* — Winston Hsu; Scott Margo

(57) ABSTRACT

A dual-exposure control circuit of an imaging system includes an RGB pixel array and a white pixel array. The dual-exposure control circuit is arranged to determine EGPs for the RGB pixel array and the white pixel array, and compensate RGB data sensed by the RGB pixel array based on the determined EGP.

20 Claims, 8 Drawing Sheets

DUAL EXPOSURE CONTROL CIRCUIT AND ASSOCIATED METHOD

BACKGROUND OF THE INVENTION

1. Field of the Invention

The present invention relates to an auto exposure control circuit, and more particularly, to a dual exposure control circuit and associated method.

2. Description of the Prior Art

A conventional automatic exposure control loop applied in an imaging system or a camera system comprises a sensor, an auto exposure engine and an image signal processor (ISP), wherein the sensor comprises a photoelectrical device for transforming the received photon into an electrical signal, an analog-to-digital converter for transforming the electrical signal into a digital signal, and a digital/analog amplifier for adjusting a magnitude of the digital signal. Traditionally, the photoelectrical device is with an electrical shutter in a CMOS image sensor for controlling the exposure time of each frame while the gain of the amplifier is well known as ISO in an imaging system. The AE engine comprises a light metering unit for measuring a brightness level of the received image, a compensator for computing an exposure time or the gain for the up-coming frames and a decision circuit for issuing commands of pixel exposure time and amplification gains.

The exposure time and the gain are the most important factors in an imaging system for adjusting the luminance of received images. How to adjust these two factors harmoniously and simultaneously is always an issue, however; greater exposure time might have a higher Signal-to-Noise Ratio (SNR) but can easily cause motion blur, whereas greater gain might have greater noise which is always unwanted. Adjusting the exposure time is usually the first choice to reach the target brightness for the received image and obtain a better SNR, but the concerned exposure time is limited by frame rate and cannot be increased unlimitedly. Likewise, the gain of pixel array cannot be increased unlimitedly due to inherent limitations of technology.

The arrangement of the pixel arrays is another important factor for the imaging system. A Bayer pattern is the most common way to arrange the Color Filter Array (CFA) in an imaging system for better luminance of frame. Recently, in order to obtain more energy for the pixel array, a white pixel has been introduced into pixel arrays to enhance sensitivity of the image sensor due to the high transmittance of white pixels whose spectral responsivity is almost twice that of a green pixel. In a single exposure control circuit, the image usually suffers from over-exposure of the white pixel due to this higher light sensitivity. When over-exposure of white pixels occurs in a single exposure control circuit, a prior art method compensates the over-exposed white pixel by using the red/blue/green (RGB) pixel around the white pixel. This method still generates an unpredictable distortion in the image, however.

SUMMARY OF THE INVENTION

One of the objectives of the present invention is to provide a dual exposure control circuit and associated method for controlling the exposure time and the gain of the RGB pixel array and the white pixel array individually.

According to an embodiment of the present invention, a dual-exposure control circuit of an imaging system comprises: a raw sensor comprising a red/green/blue (RGB) pixel array, a white pixel array and at least a signal conditioner for adjusting a gain or an exposure time of the RGB pixel array and the white pixel array; and an auto exposure engine. The auto exposure engine comprises: a first computing unit, arranged to compute a statistical value according to data of a current frame sensed by the RGB pixel array and compare the statistical value with a target image brightness to generate a comparing result; a compensator, coupled to the first computing unit, arranged to generate an indicating parameter to indicate the gain or the integration time of the RGB pixel array and W pixel array according to the comparing result; and a decision circuit, coupled to the compensator, arranged to determine a compensation coefficient and a first control signal according to the indicating parameter, wherein when the decision circuit determines that the luminance level of the current frame is greater than a threshold value, the decision circuit makes the imaging system operate in a normal light mode and sends the first control signal to the analog signal conditioner to control the gain or exposure time of the white pixel array to be a fixed value less than the gain of the RGB pixel array, and when the decision circuit determines that the luminance level of the current frame is smaller than a threshold value, the decision circuit makes the imaging system operate in a low light mode and sends the first control signal to the analog signal conditioner to make the gain or exposure time of the white pixel array larger than when operating in the normal light mode. The dual-exposure control circuit further comprises a low-light compensation unit, arranged to use the compensation coefficient to compensate data of a next frame sensed by the RGB pixel array.

According to an embodiment of the present invention, a dual exposure control method applied in an imaging system comprises: computing a statistical value according to data of a current frame sensed by the RGB pixel array and comparing the statistical value with a target image brightness to generate a comparing result; generating an indicating parameter to indicate the gain or the integration time of the RGB pixel array and W pixel array according to the comparing result; determining a compensation coefficient and a first control signal according to the indicating parameter, wherein when the luminance level of the current frame is greater than a threshold value, the imaging system operates in a normal light mode and sends the first control signal to control the gain or exposure time of the white pixel array to be a fixed value less than the gain of the RGB pixel arrays, and when the luminance level of the current frame is smaller than a threshold value, the imaging system operates in a low light mode and sends the first control signal to make the gain or exposure time of the white pixel array larger than operating in the normal light mode; and using the compensation coefficient to compensate data of a next frame sensed by the RGB pixel array.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
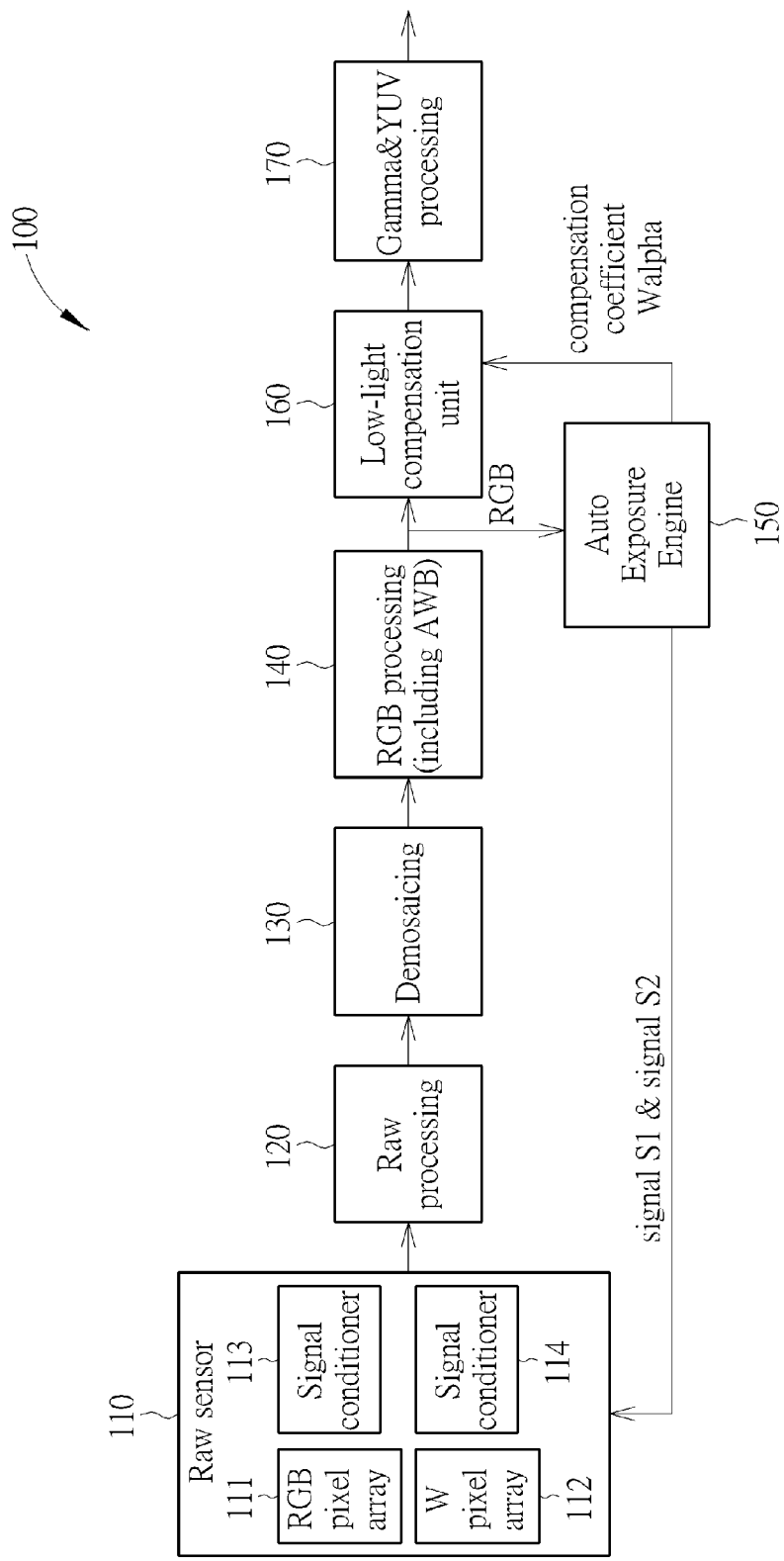
FIG. 1 is a diagram illustrating an imaging system with dual exposure control circuit according to an embodiment of the present invention.

FIG. 1 is a diagram illustrating an imaging system 100 with dual exposure control circuit according to an embodiment of the present invention. As shown in FIG. 1, the imaging system 100 comprises a raw sensor 110, a raw processing block 120, a demosaicing block 130, an RGB processing block 140, an auto exposure engine 150, a low-light compensation unit 160 and a Gamma & YUV processing block 170. The raw sensor 110 is arranged to output raw data of the RGB pixel array 111 and a white pixel array 112 included within the raw sensor 110, and receive signals S1 and S2 generated by the auto exposure engine 150 for controlling exposure times and gains of the RGB pixel array 111 and the white pixel array 112, respectively. The raw processing block 120 is arranged to perform basic processes on the raw data of the RGB pixel array 111 and the white pixel array 112 generated by the raw sensor 110. The demosaicing block 130 is arranged to perform interpolation to estimate the missing color information at each location due to a pixel at a location only producing one color information R, G, B or white in the CFA. The RGB processing block 140 is arranged to perform advance operations on the RGB pixel array 111 such as white balance, color correction, denoising and sharpening. The raw sensor 110 further comprises signal conditioners 113 and 114 for adjusting the exposure time and the gain of the RGB pixel array 111 and the white pixel array 112, respectively. In another embodiment, the raw sensor 110 can comprise only one switching type signal conditioner to adjust the exposure time and gain of the RGB pixel array 111 and the white pixel array 112. The auto exposure engine 150 is arranged to receive the image of the current frame and generate the signals S1 and S2 and a compensation coefficient $W_{alpha}$, wherein the signals S1 and S2 are for controlling the exposure time and gain of the RGB pixel array 111 and the white pixel array 112 for the next frame according to the current frame, and the compensation coefficient $W_{alpha}$ is for compensating the brightness of the next frame. The low-light compensation unit 160 is arranged to receive the image data of a current frame and use the compensation coefficient $W_{alpha}$ to compensate the brightness of the image; and the Gamma & YUV processing block 170 is for performing Gamma operation and YUV operation on the image.

In the present invention, a parameter is defined as a product of the exposure time and the gain of a pixel array, known as the Exposure time and Gain Product (EGP), which indicates the level of adjusting the exposure time and the gain of pixel array for the frame. Therefore, in the present invention, the pixel value is simplified as the product of EGP and the energy the pixel receives. For example, for a red pixel in a red pixel array, the pixel value can be represented as $$R = EGP * I_r$$

wherein R is the output data of the red pixel, and $I_r$ is the received light energy in a unit exposure time for the red pixel. And for simplicity, the statistical mean value of the output data of the red pixel array can be further represented as $$M_R = EGP * M_{Ir}$$

wherein $M_R$ is the statistical mean of the R pixel array, and $M_{Ir}$ is the mean of the received light energy in a unit exposure time for the red pixel array.

Figure 2:
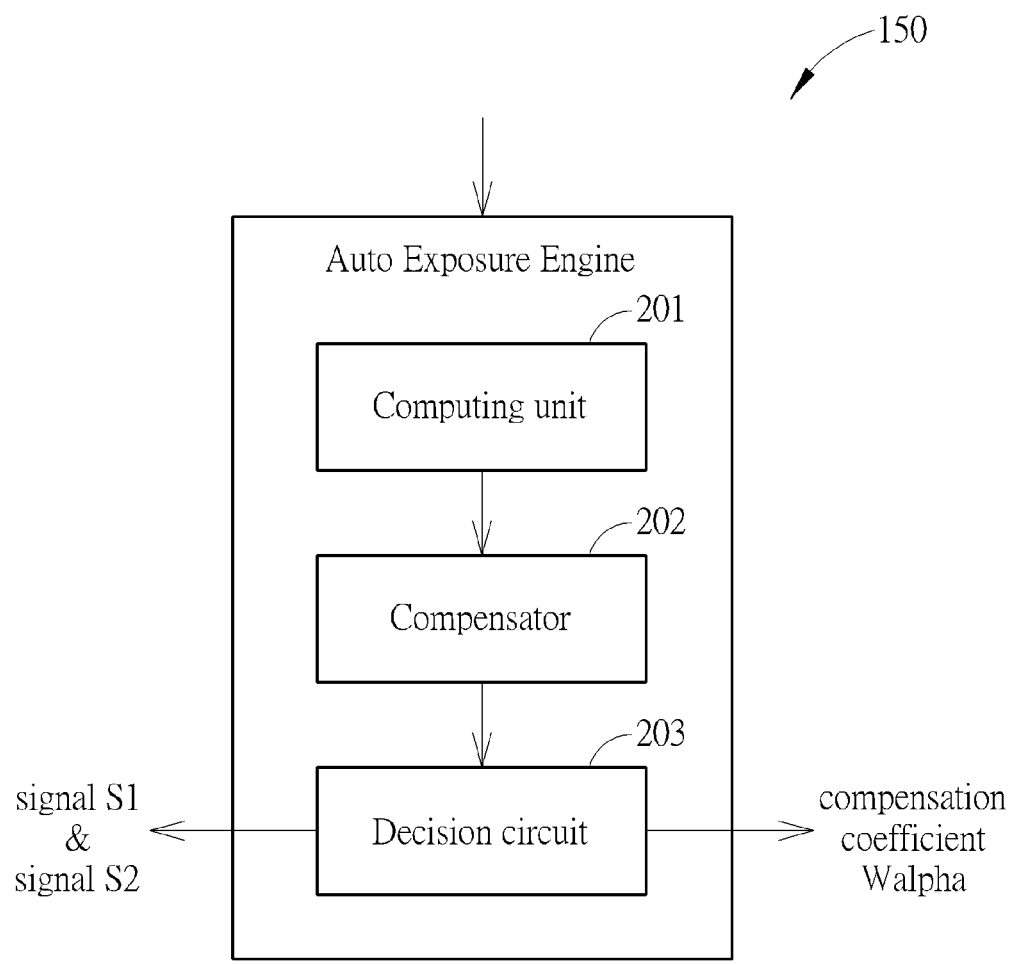
FIG. 2 is a diagram illustrating an auto exposure engine of the imaging system shown in FIG. 1 according to an embodiment of the present invention.

FIG. 2 is a diagram illustrating an auto exposure engine 150 of the imaging system 100 shown in FIG. 1 according to an embodiment of the present invention. As shown in FIG. 2, the auto exposure engine 150 comprises a computing unit 201, a compensator 202 and a decision circuit 203. The computing unit 201 is arranged to color transform the RGB pixel array 111 into a Y pixel array, and compute the statistical mean of the Y pixel array which indicates the brightness of the current frame, then compare the brightness of the current frame with a target image brightness $Y_{tar}$ to generate a comparing result. The compensator 202 is arranged to compute a wanted EGP for the next frame according to the comparing result to indicate a level of adjusting the exposure time and the gain of the RGB pixel array for the next frame.

The decision circuit 203 is arranged to decide and control the exposure time and the gain of the RGB pixel array 111 and the white pixel array 112 for the next frame according to the wanted EGP by generating the signals S1 and S2, and the decision circuit 203 generates the compensation coefficient $W_{alpha}$ for compensating the brightness of the next frame, wherein if the wanted EGP computed by the compensator 202 is smaller than a maximum of EGP (that is, the brightness of the current frame can reach the level of the target image brightness $Y_{tar}$ without compensation from the white pixel array 112), the imaging system 100 operates in normal light node, and the decision circuit 203 set the EGP of the RGB pixel array 111 for the next frame to be the wanted EGP and sets the EGP of the white pixel array 112 for the next frame to be the wanted EGP multiplied by a ratio $R_0$, wherein the ratio $R_0$ is a number between 0 and 1. In this embodiment, the ratio $R_0$ is ½ due to the sensitivity of the white pixel array being approximately twice that of the green pixel. This setting can prevent the white pixel array from over exposure. The compensation coefficient $W_{alpha}$ is set to be 0 since the current frame does not need any compensation. If the wanted EGP computed by the compensator 202 is greater than the maximum of EGP (that is, the brightness of the current frame cannot reach the level of the target brightness $Y_{tar}$ by only using the RGB pixel array), the imaging system 100 operates in a low-light mode. The current frame needs the white pixel array to compensate the brightness, and the decision circuit 203 sets the EGP of the RGB pixel array 111 for the next frame to be the maximum of EGP, and sets the EGP of the white pixel array 112 for the next frame to be $$\min(R_0 * EGP_j, EGP_{max}) \quad (1)$$

wherein "min" is a minimum operator, $EGP_j$ is the wanted EGP and $EGP_{max}$ is the maximum of EGP, and the compensation coefficient $W_{alpha}$ is set to be $$R_0 * (EGP_j - EGP_{max}) / EGP_w \quad (2)$$

wherein the $EGP_w$ is the EGP of the white pixel array 112 calculated above. After computing the EGP of the RGB pixel array 111, the EGP of the white pixel array 112 and the compensation coefficient $W_{alpha}$, the decision circuit 203 transmits the signals S1 and S2 according to the EGP of the RGB pixel array 111 and the white pixel array 112, respectively, to the raw sensor 101 for controlling the exposure time and gain of the RGB pixel array 111 and the white pixel array 112 for the next frame, and transmits the compensation coefficient $W_{alpha}$ to the low light compensation unit 160. When the imaging system 100 operates in the low light mode, the low light compensation unit 160 computes the value of the RGB pixel array 111 with the white pixel array 112 and the compensation coefficient $W_{alpha}$ for compensating the shortage of brightness of the frame as follows:

$$R' = \max(R, G, B) + W_{alpha} * W \quad (3-1)$$

$$G' = \max(R, G, B) + W_{alpha} * W \quad (3-2)$$

$$B' = \max(R, G, B) + W_{alpha} * W \quad (3-3)$$

Wherein max is a maximum operator. R, G and B represent the data of red, green and blue pixels respectively of a pixel array. R', G', B' represent the data of red, green and blue pixels after low-light compensation, and W is the data of white pixel array. Taking a color space conversion from R', G' B' can obtain:

$$Y' = Y + W_{alpha} * W \quad (3-4)$$

Wherein Y is the data of the Y pixel array, and Y' is the data of the Y pixel array after compensation.

In the embodiment of FIG. 2, the target image brightness $Y_{tar}$, the maximum of EGP and the ratio $R_0$ are all defined in the compensator 202 first.

Figure 3:
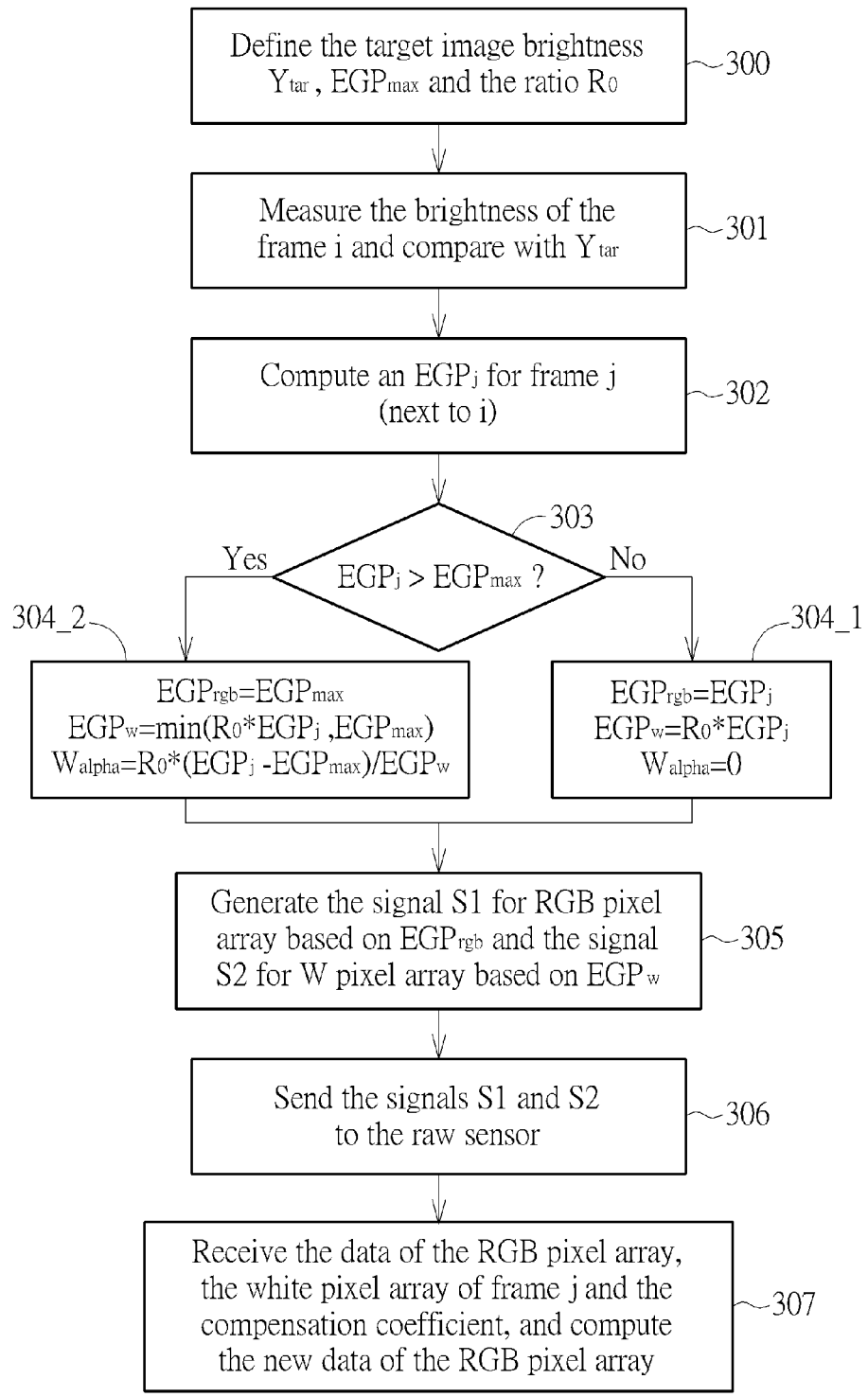
FIG. 3 is a flowchart illustrating a method of applying dual exposure control shown in FIG. 1 and FIG. 2 according to an embodiment of the present invention.

FIG. 3 is a flowchart illustrating a method of applying the dual exposure control shown in FIG. 1 and FIG. 2 according to an embodiment of the present invention. The steps of the flow shown in FIG. 3 are described as follows:

Step 300: define the target image brightness $Y_{tar}$, the maximum of EGP and the ratio $R_0$.

Step 301: measure the brightness of the frame i and compare with the target image brightness $Y_{tar}$. The brightness of the current frame, i.e. frame i, is measured by computing the statistical mean of the color transformed Y pixel array from the RGB pixel array in the computing circuit 201 of the auto exposure engine 150, and the measured brightness of the current frame is compared with the target image brightness $Y_{tar}$ to generate a comparing result.

Step 302: compute an $EGP_j$ for frame j (next to i). The wanted EGP for the next frame, i.e. frame j, is computed according to the comparing result.

Step 303: determine whether the wanted EGP for the next frame is greater than the maximum EGP or not. In detail, it is determined whether the wanted EGP for the next frame is greater than the maximum EGP or not, wherein if yes, the imaging system 100 operates in the low light mode and the flow goes to Step 304_2, otherwise, the imaging system 100 operates in the normal light mode and the flow goes to Step 304_1.

Step 304_1: set the $EGP_{rgb} = EGP_j$, $EGP_w = R_0 * EGP_j$ and $W_{alpha} = 0$.

Step 304_2: set the $EGP_{rgb} = EGP_{max}$, $EGP_w = \min(R_0 * EGP_j, EGP_{max})$ and $W_{alpha} = R_0 * (EGP_j - EGP_{max}) / EGP_w$. The symbols described in the steps 304_1 and 304_2 are identical to the symbol in the embodiment of FIG. 2.

Step 305: generate the signals S1 and S2. The signal S1 is generated for controlling the exposure time and gain of the RGB pixel array 111 for the next frame according to $EGP_{rgb}$, and the signal S2 is generated for controlling the exposure time and gain of the white pixel array 112 for the next frame according to $EGP_w$.

Step 306: send the signals S1 and S2 to the raw sensor.

Step 307: receive the data of the RGB pixel array, the white pixel array of frame j and the compensation coefficient, and compute the new data of the RGB pixel array. In detail, the low light compensation unit 160 receives the data of the RGB pixel array 111, the white pixel array 112 and the compensation coefficient $W_{alpha}$, and computes the new data of the RGB pixel array of the frame according to the formulas (3-1) to (3-4) for compensating the brightness of the frame.

Figure 4:
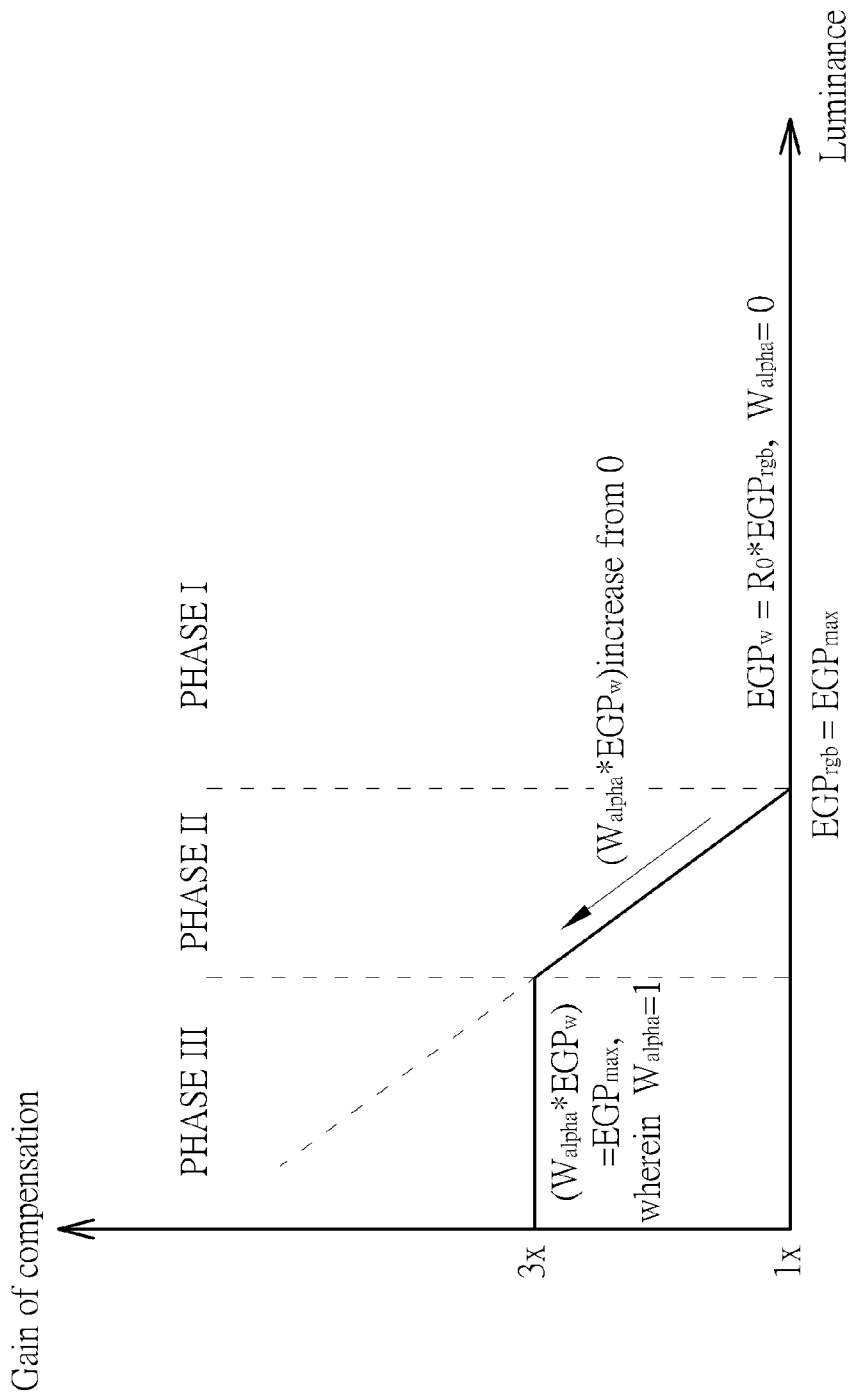
FIG. 4 is a diagram illustrating a working condition of a dual exposure control circuit shown in FIG. 1 and FIG. 2 according to an embodiment of the present invention.

FIG. 4 is a diagram illustrating a working condition of a dual exposure control circuit shown in FIG. 1 and FIG. 2 according to an embodiment of the present invention. As shown in FIG. 4, in the "Phase I", the frame has enough luminance, the imaging system operates in the normal light mode, and the EGP of the RGB pixel array increases if the luminance of the illuminated environment decreases. In the "Phase II", the EGP of the RGB pixel array reaches the maximum EGP and the imaging system operates in the low light mode; therefore, the compensation coefficient $W_{alpha}$ and the EGP of the white pixel array are used to compensate the brightness of the image from the RGB pixel array. If the luminance from the environment keeps going down, the product of the compensation coefficient $W_{alpha}$ and the EGP of the white pixel array increases to maintain the brightness of the frame. In other embodiments, the compensation coefficient $W_{alpha}$ can be any positive number. In order to obtain the best SNR, the compensation coefficient $W_{alpha}$ is preferably defined between 0 and 1. In this case, when the product of the compensation coefficient $W_{alpha}$ and the EGP of the white pixel array reaches the maximum (i.e. $W_{alpha} * EGP_w = EGP_{max}$), the new/compensated data of the RGB pixel array of the frame obtains many times the brightness of the original frame according to the formula (3). The imaging system then enters the "phase III". In the "Phase III", the brightness of the frame decreases if the luminance from the environment keeps going down.

It should be noted that, in the embodiment of FIG. 4, the EGP of the RGB pixel array increases in the "phase I" to reach the target image brightness if the luminance from the environment goes down. During this period, however, the increase of the EGP of the RGB pixel array is not limited to adjust the exposure time or the gain of the RGB pixel array first as long as the frame can reach the target image brightness.

Figure 5:
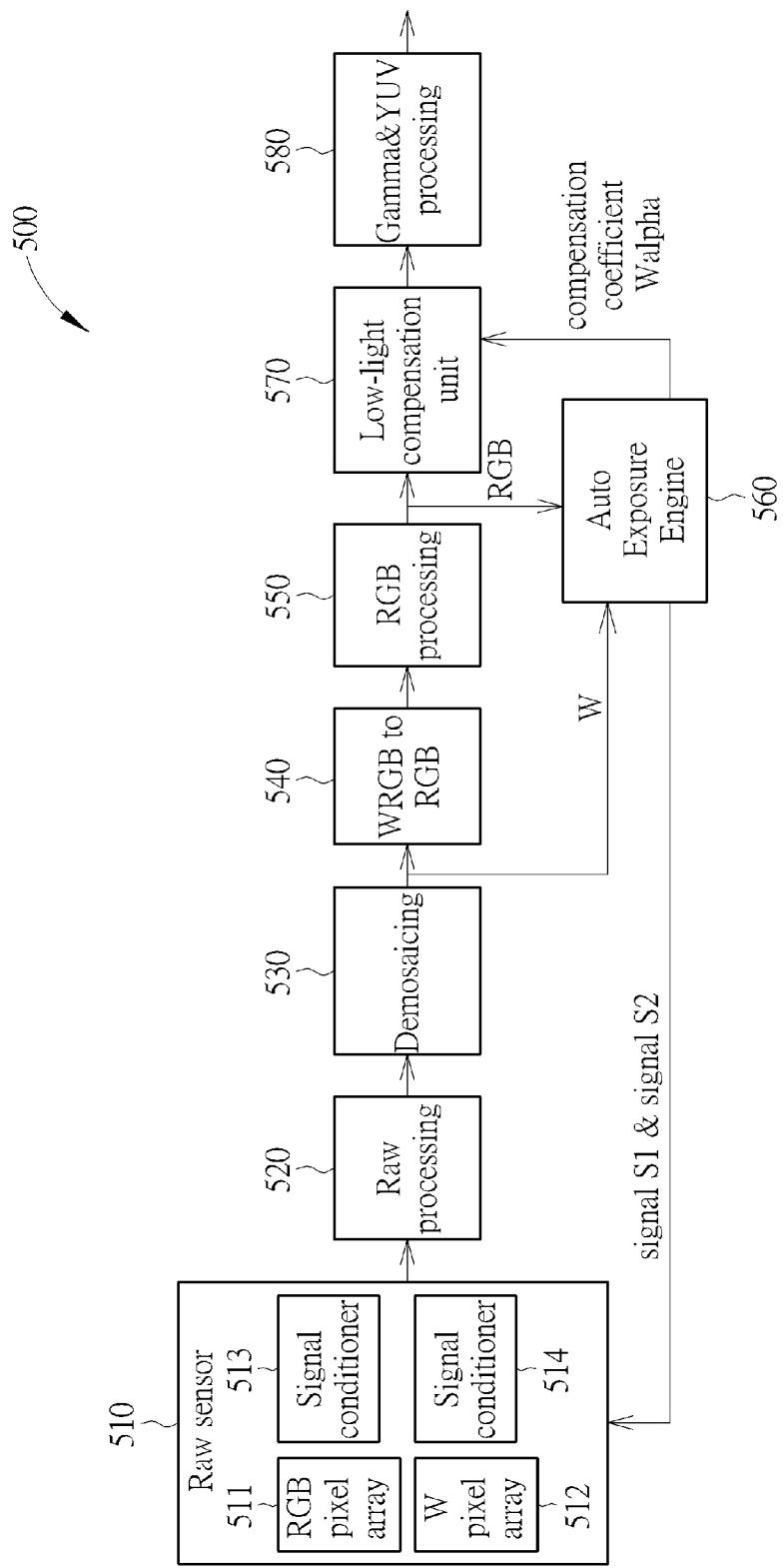
FIG. 5 is a diagram illustrating an imaging system according to another embodiment of the present invention.

FIG. 5 is a diagram illustrating an imaging system 500 according to another embodiment of the present invention.

The imaging system 500 utilizes the data of a RGB pixel array 511 and a white pixel array 512 of the current frame rather than only the data of the RGB pixel array (e.g. the embodiments of FIG. 1 to FIG. 3) to complete the brightness compensation. As shown in FIG. 5, the imaging system 500 comprises a raw sensor 510, a raw processing block 520, a demosaicing block 530, a white-RGB to RGB block 540, an RGB processing block 550, an auto exposure engine 560, a low-light compensation unit 170 and a Gamma & YUV processing block 580, wherein the white-RGB to RGB block 540 is arranged to color transform four channels (white, red, green and blue) information into three channels (red, green and blue). The functions of the other components in the imaging system 500 are similar to the embodiment of FIG. 1, so the detailed descriptions are omitted here for brevity.

Figure 6:
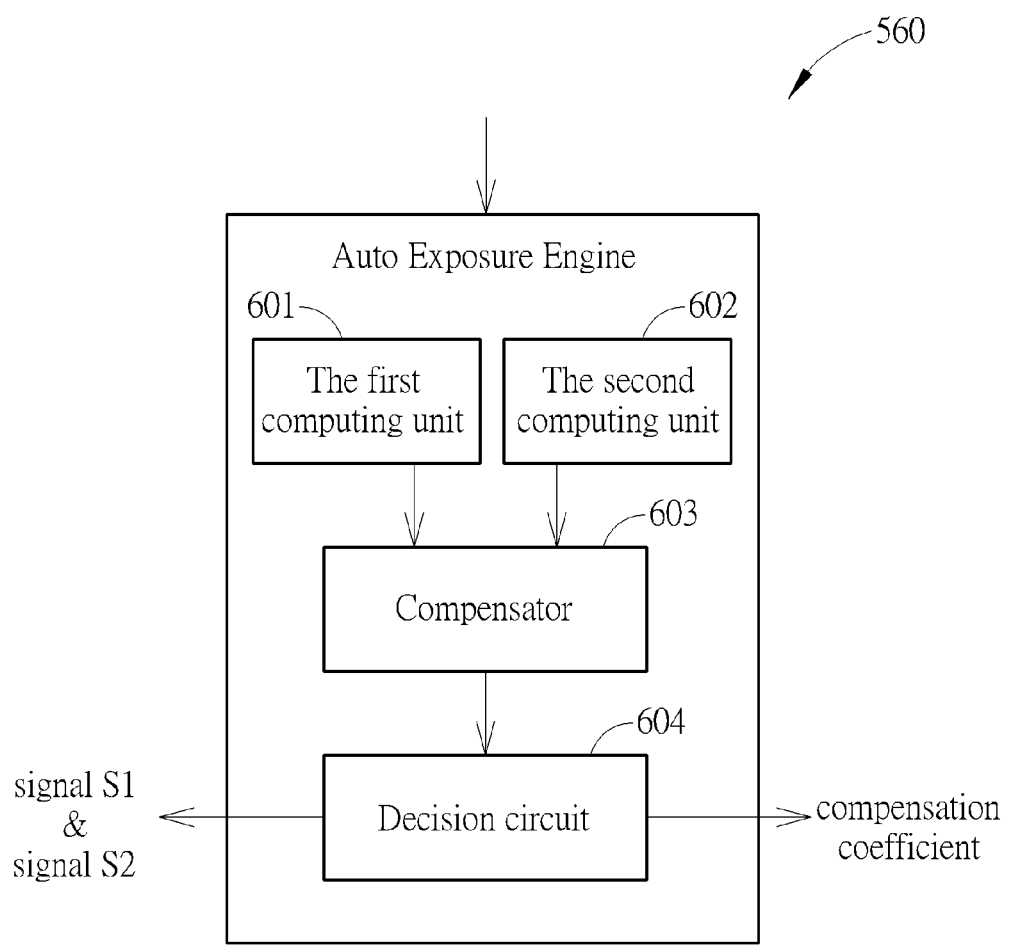
FIG. 6 is a diagram illustrating an auto exposure engine of the imaging system with dual exposure control circuit shown in FIG. 5 according to another embodiment of the present invention.

FIG. 6 is a diagram illustrating an auto exposure engine of the imaging system 500 with dual exposure control circuit shown in FIG. 5 according to another embodiment of the present invention. As shown in FIG. 6, the auto exposure engine 560 comprises a first computing unit 601 and a second computing unit 602, a compensator 603 and a decision circuit 604, wherein the first computing unit 601 is identical to the computing unit 201 shown in FIG. 2 and the second computing unit 602 is arranged to compute a statistical mean of the white pixel array 512. One difference between the embodiments shown in FIGS. 1 and 5 is when the imaging system operates in the low light mode, the compensation coefficient $W_{alpha}$ is set to be $$(Y_{tar}-M_Y)/M_w \quad (4)$$

wherein $M_w$ is the statistical mean of white pixel array of the current frame generated from the second computing unit 602. In practice, the pixel value might be limited by the accuracy of the digital circuit. For example, in the formula $M_R=EGP*M_{Ir}$, when EGP becomes twice as large, The mean of the red pixel array may not be doubled due to data clipping in a limited range given by the digital circuit. A distortion may occur. With compensation coefficient $W_{alpha}$ using the statistical means as factors shown in the formula (4) instead of the EGP, the above-mentioned problem can be prevented.

Figure 7:
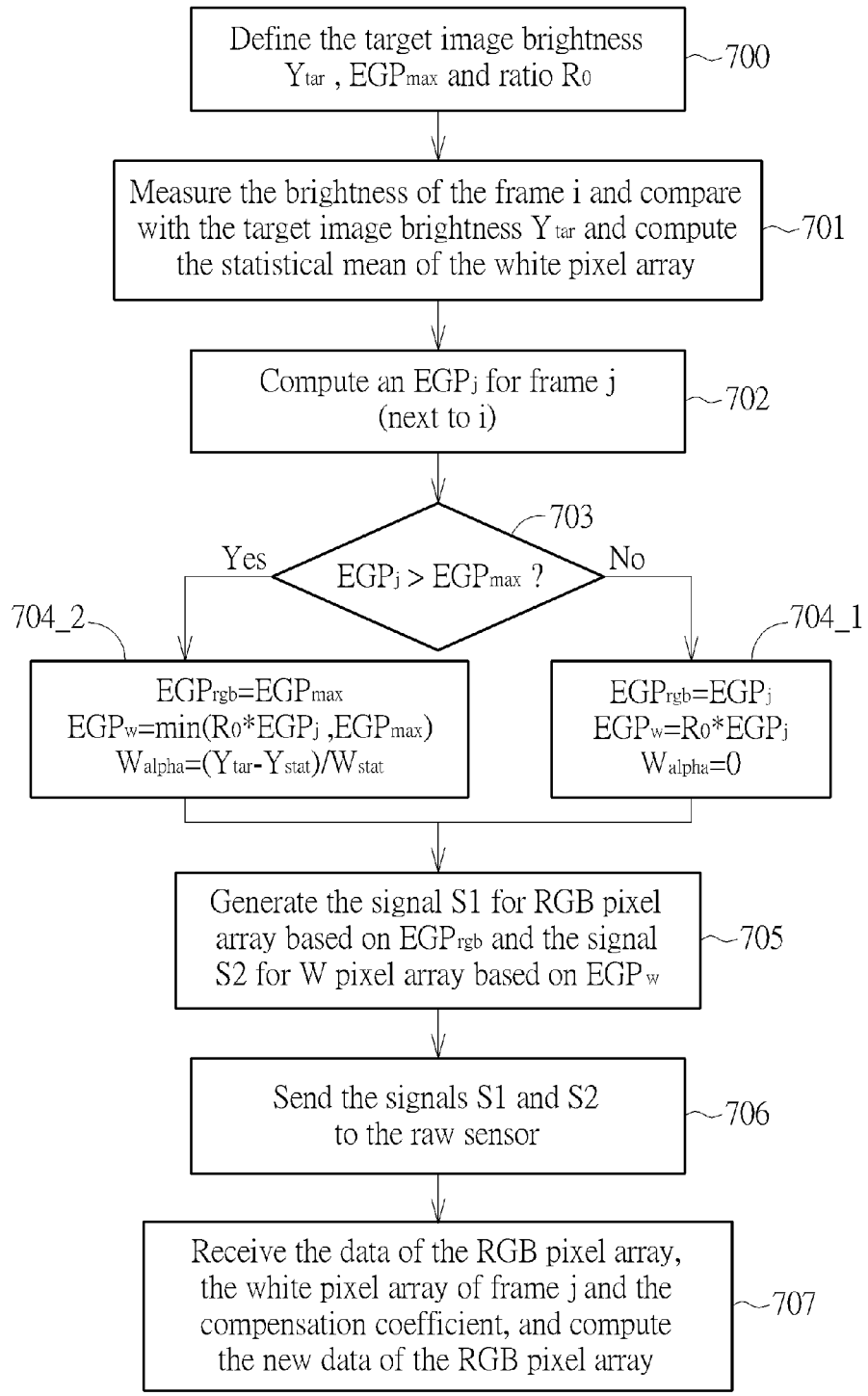
FIG. 7 is a flowchart illustrating a method of applying dual exposure control according to another embodiment of the present invention.

FIG. 7 is a flowchart illustrating a method of applying the dual exposure control shown in FIG. 5 and FIG. 6 according to another embodiment of the present invention. The steps of the flow shown in FIG. 7 are described as follows:

Step 700: define the target image brightness $Y_{tar}$, the maximum of EGP and a ratio $R_0$.

Step 701: measure the brightness of the frame i and compare with the target image brightness $Y_{tar}$ and compute the statistical mean of the white pixel array. The brightness of the current frame, i.e. frame i, is measured by computing the statistical mean of the color transformed Y pixel array from the RGB pixel array in the computing circuit 601 of the auto exposure engine 560, the measured brightness is compared with the target image brightness $Y_{tar}$ to generate a comparing result, and the AE engine 560 further computes the statistical mean of the white pixel array.

Step 702: compute an $EGP_j$ for frame j (next to i). The wanted EGP for the next frame, i.e. frame j, is computed according to the comparing result.

Step 703: determine whether the wanted EGP for the next frame is greater than the maximum EGP or not. In detail, it is determined whether the wanted EGP for the next frame is greater than the maximum EGP or not, wherein if yes, the imaging system 100 operates in the low light mode and the flow goes to the Step 704_2, otherwise, the imaging system 100 operates in the normal light mode and the flow goes to Step 704_1.

Step 704_1: set $EGP_{rgb}=EGP_j$, $EGP_w=R_0*EGP_j$ and $W_{alpha}=0$.

Step 704_2: set $EGP_{rgb}=EGP_{max}$, $EGP_w=\min(R_0*EGP_j, EGP_{max})$ and $W_{alpha}=(Y_{tar}-M_Y)/M_w$. wherein the symbols described in the steps 704_1 and 704_2 are identical to the symbols in the embodiment of FIG. 2 and FIG. 6.

Step 705: generate the signals S1 and S2. The signal S1 is generated for controlling the exposure time and the gain of the RGB pixel array 511 for the next frame according to $EGP_{rgb}$, and the signal S2 is generated for controlling the exposure time and the gain of the white pixel array 512 for the next frame according to $EGP_w$.

Step 706: send the signals S1 and S2 to the raw sensor.

Step 707: receive the data of the RGB pixel array, the white pixel array of frame j and the compensation coefficient, and compute the new data of the RGB pixel array. The low light compensation unit 570 receives the data of the RGB pixel array 511, the white pixel array 512 and the compensation coefficient $W_{alpha}$, and computes the new data of the RGB pixel array of the frame according to the formulas (3-1) to (3-4) for compensating the brightness of the frame.

In the embodiments of FIG. 1 to FIG. 7, the statistical mean of pixel array is not limited to be a weighted mean, and can also be any statistical mean which represents the brightness of the pixel array.

Figure 8:
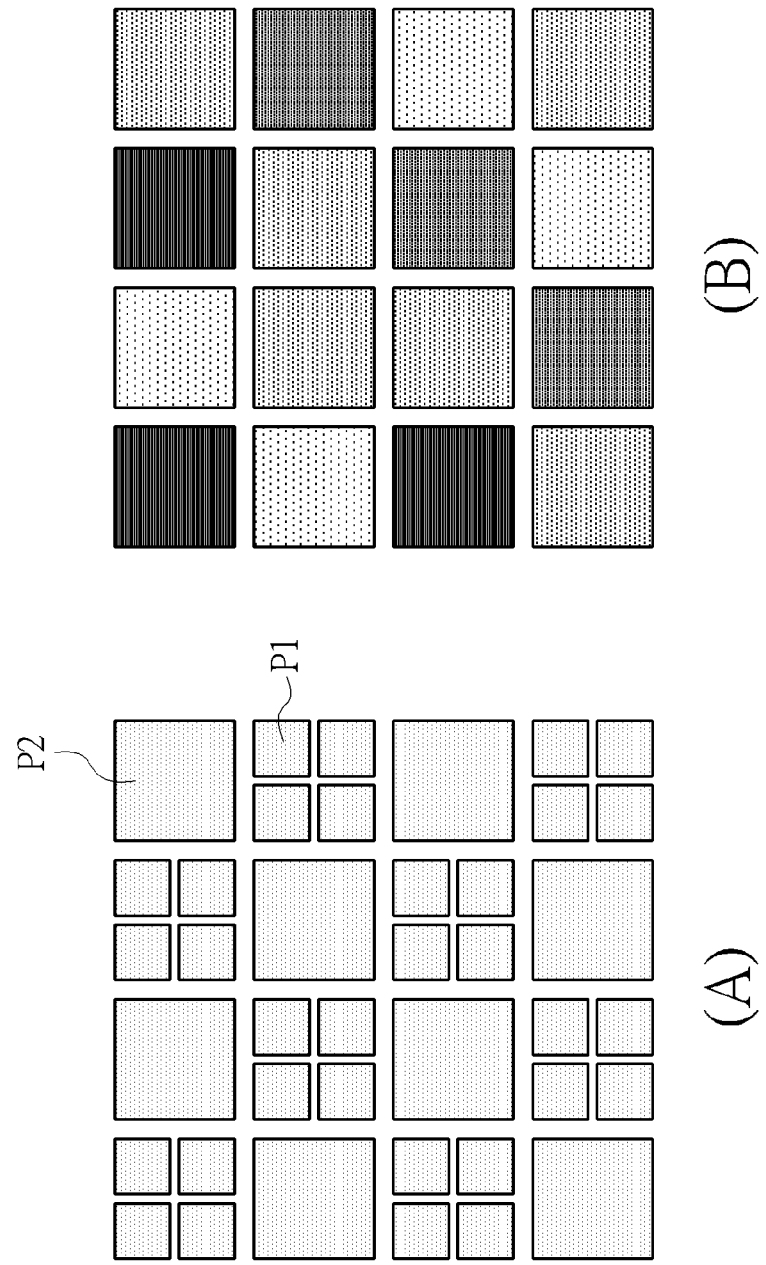
FIG. 8 is a diagram illustrating examples of dual exposure gain according to an embodiment of the present invention.

The dual exposure control circuit and associated method in the present invention are not limited to be applied to the RGB pixel array and the white pixel array, and can also be applied to sensors with two groups of pixels with different sensitivity such as composite-size pixel array, uLens/CF transmittance, dual conversion gain and Dual analog circuit gain. FIG. 8 is a diagram illustrating examples of dual exposure gain according to an embodiment of the present invention. Take composite pixel array for example, a pixel array P1 with smaller size operates as the RGB pixel array and a pixel array P2 with larger size operates as the white pixel array in the disclosed embodiments. As shown in the sub-diagram (A) of FIG. 8, the size of the pixel array P2 is four times as large as the pixel array P1. When the pixel arrays are appropriately arranged, the sensitivity of the pixel array P2 is four times as large as the sensitivity of the pixel array P1. In this case, the pixel array P2 operates as the white pixel array while the pixel array P1 operates as the RGB pixel array in the disclosed embedment. Take composite transmittance uLens/CF for another example, as shown in the sub-diagram (B) of FIG. 8, utilizing the difference of thickness or transmittance of Micron Lens (uLens) or Color Filter (CF) to produce different sensitivity between pixel and pixel, wherein the pixel with higher sensitivity can be regarded as white pixel array, and the pixel with lower sensitivity can be regarded as the RGB pixel array. Take the dual conversion gain cited from Aptina DR-pix white paper for another example, in this case, the conversion gain represents the gain between the output voltage and an electron. Thus, a group of pixel with higher conversion gain can obtain the relatively higher output voltage with fixed quantity of electrons than a group of pixel with lower conversion gain, wherein the group of pixel with higher conversion gain can be regarded as the white pixel array and the group of pixel with lower conversion gain can be regarded as the RGB pixel array in the disclosed embodiment. Take dual analog circuit gain for yet another example, the gains of two groups of pixel array can be chosen to be different to obtain the same effect that the RGB pixel and the white pixel array achieve which is similar to the dual conversion gain mentioned above, the only difference is the analog circuit gain is set by an analog circuit. These alternative designs should fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dual-exposure control circuit of an imaging system, comprising:
    a raw sensor, comprising a first group pixel array, a second group pixel array and at least a signal conditioner for adjusting gains or an exposure time of the first group pixel array and the second group pixel array;
    an auto exposure engine, comprising:
        a first computing unit, arranged to compute a statistical value according to data of a current frame sensed by the first group pixel array and compare the statistical value with a target image brightness to generate a comparing result;
        a compensator, coupled to the first computing unit, arranged to generate an indicating parameter to indicate the gain or the integration time of the first group pixel array and second group pixel array according to the comparing result; and
        a decision circuit, coupled to the compensator, arranged to determine a compensation coefficient and a first control signal according to the indicating parameter, wherein when the decision circuit determines that the imaging system operates in a normal light mode, the decision circuit sends the first control signal to the signal conditioner to control the gain or the exposure time of the second group pixel array to be a value less than the gain or the exposure time of the first group pixel array; and when the decision circuit determines that the imaging system operates in a low light mode, the decision circuit sends the first control signal to the signal conditioner to make the gain or the exposure time of the second group pixel array larger than the gain or the exposure time when the imaging system operates in the normal light mode; and
    a low-light compensation unit, arranged to use the compensation coefficient to compensate data of a next frame sensed by the first group pixel array.

2. The dual-exposure control circuit of the imaging system of claim 1, wherein the indicating parameter is a wanted exposure time and gain product (EGP), and when the wanted EGP of the first group pixel array is less than a maximum of the EGP of the first group pixel array, the imaging system operates in the normal light mode, the EGP of the first group pixel array for a next frame is set to be the wanted EGP of the first group pixel array for the next frame, an EGP of the second group pixel array for the next frame is set to be less than the EGP of the first group pixel array, and the compensation coefficient is set to be zero.

3. The dual-exposure control circuit of the imaging system of claim 1, wherein the indicating parameter is a wanted exposure time and gain product (EGP), and when the wanted EGP of the first group pixel array is larger than a maximum of the EGP of the first group pixel array, the imaging system operates in the low-light mode, and the EGP of the first group pixel array for the next frame is set to be the maximum of the EGP of the first group pixel array, and the EGP of the second group pixel array for the next frame is set to be:

$$\min(R_0*EGP_j, EGP_{max}),$$

and compensation coefficient is set to be:

$$R_0*(EGP_j-EGP_{max})/EGP$$

wherein "min" is a minimum operator, $R_0$ is a ratio between the EGP of the second group pixel array and the EGP of the first group pixel array, $EGP_j$ is the wanted EGP of the first group pixel array for the next frame, $EGP_{max}$ is a maximum of the first group pixel array, and EGP is the EGP of the second group pixel array for the next frame.

4. The dual-exposure control circuit of the imaging system of claim 1, wherein the decision circuit is further arranged to determine a second control signal according to the comparing result, and the second control signal is arranged to control the exposure time of the first group pixel array for the next frame.

5. The dual-exposure control circuit of the imaging system of claim 4, wherein the second control signal is further arranged to control the gain of the signal conditioner for the first group pixel array, and the first control signal is arranged to control the gain of at least an analog signal conditioner for the second group pixel array and the exposure time of the second group pixel array in the raw sensor for the next frame.

6. The dual-exposure control circuit of the imaging system of claim 1, wherein the auto exposure engine further comprises a second computing unit arranged to compute a statistical mean of the second group pixel array of the current frame.

7. The dual-exposure control circuit of the imaging system of claim 6, wherein the decision circuit is further arranged to determine a wanted EGP, and when the wanted EGP of the first group pixel array is less than the maximum of the EGP of the first group pixel array, the imaging system operates in the normal light mode, the EGP of the first group pixel array for the next frame is set to be the wanted EGP of the first group pixel array for the next frame, an EGP of the second group pixel array for the next frame is set to be less than the EGP of the first group pixel array, and the compensation coefficient is set to be zero.

8. The dual-exposure control circuit of the imaging system of claim 6, wherein when the wanted EGP of the first group pixel array is larger than the maximum of the EGP of the first group pixel array, the imaging system operates in the low-light mode, the EGP of the first group pixel array of the next frame is set to be the maximum of the EGP of the first group pixel array and the second group pixel array, the EGP of the second group pixel array for the next frame is set to be $$\min(R_0*EGP_j, EGP_{max}),$$

and the compensation coefficient is set to be $$(M_{Y,target}-M_{Y[n]})/M_{[n]}$$

wherein $M_{Y,target}$ is the target image brightness, $M_{Y[n]}$ is the statistical value of the first group pixel array of the current frame and $M_{[n]}$ is the statistical mean of second group pixel array of the current frame.

9. The dual-exposure control circuit of the imaging system of claim 6, wherein the second control signal is arranged to control the gain of a signal conditioner for the first group pixel array and the exposure time of the first group pixel array in the raw sensor, and the first control signal is arranged to control the gain of the signal conditioner for the second group pixel array and the exposure time of the second group pixel array in the raw sensor.

10. The dual-exposure control circuit of the imaging system of claim 1, wherein the first group pixel array is composed of at least one of R, G, B colorful pixels and the second group pixel array is white pixel array, or the first group pixel array and the second group pixel array are two pixel arrays with different sensitivity, wherein the second group pixel array has the higher sensitivity than the first group pixel array does.

11. A dual exposure control method applied in an imaging system, comprising:
  computing a statistical value according to data of a current frame sensed by a first group pixel array and comparing the statistical value with a target image brightness to generate a comparing result;
  generating an indicating parameter to indicate the gain or the integration time of the first group pixel array and a second group pixel array according to the comparing result;
  determining a compensation coefficient and a first control signal according to the indicating parameter, wherein when the luminance level of the current frame is greater than a threshold value, the imaging system operates in a normal light mode and sends the first control signal to control the gain or the exposure time of the second group pixel array to be a fixed value less than the gain or the exposure time of the first group pixel array; and when the imaging system operates in a low light mode, sending the first control signal to make the gain or the exposure time of the second group pixel array larger than the gain or the exposure time when the imaging system operates in the normal light mode; and
  using the compensation coefficient to compensate data of a next frame sensed by the first group pixel array.

12. The dual-exposure control method applied in the imaging system of claim 11, wherein the indicating parameter is a wanted exposure time and gain product (EGP), and when the wanted EGP of the first group pixel array is less than a maximum of the EGP of the first group pixel array, the imaging system operates in the normal light mode, the EGP of the first group pixel array for a next frame is set to be the wanted EGP of the first group pixel array for the next frame, an EGP of the second group pixel array for the next frame is set to be less than the EGP of the first group pixel array, and the compensation coefficient is set to be zero.

13. The dual-exposure control method applied in the imaging system of claim 11, wherein the indicating parameter is the wanted EGP, and when the wanted EGP of the first group pixel array is larger than a maximum of the EGP of the first group pixel array, the imaging system operates in the low-light mode, the EGP of the first group pixel array for the next frame is set to be the maximum of the EGP of the first group pixel array, the EGP of the second group pixel array for the next frame is set to be:

$$\min(R_0 * EGP_j, EGP_{max}),$$

and the compensation coefficient is set to be:

$$R_0 * (EGP_j - EGP_{max})/EGP$$

wherein "min" is a minimum operator, $R_0$ is a ratio between the EGP of the second group pixel array and the EGP of the first group pixel array, $EGP_j$ is the wanted EGP of the first group pixel array for the next frame, $EGP_{max}$ is a maximum of the first group pixel array, and EGP is the EGP of the second group pixel array for the next frame.

14. The dual-exposure control method applied in the imaging system of claim 11, further comprising:
  determining a second control signal according to the comparing result, wherein the second control signal is arranged to control the exposure time of the first group pixel array for the next frame.

15. The dual-exposure control method applied in the imaging system of claim 13, wherein the second control signal is further arranged to control the gain of the first group pixel array, and the first control signal is arranged to control the gain of the second group pixel array and the exposure time of the second group pixel array for the next frame.

16. The dual-exposure control method applied in the imaging system of claim 11, further comprising:
  computing a statistical mean of the second group pixel array of the current frame.

17. The dual-exposure control method applied in the imaging system of claim 16, wherein the indicating parameter is the wanted EGP, and when the wanted EGP of the first group pixel array is less than the maximum of the EGP of the first group pixel array, the imaging system operates in the normal light mode, the EGP of the first group pixel array for the next frame is set to be the wanted EGP of the first group pixel array for the next frame, an EGP of the second group pixel array for the next frame is set to be less than the EGP of the first group pixel array, and the compensation coefficient is set to be zero.

18. The dual-exposure control method applied in the imaging system of claim 16, wherein the indicating parameter is the wanted EGP, and when the wanted EGP of the first group pixel array is larger than the maximum of the EGP of the first group pixel array, the imaging system operates in the low-light mode, the EGP of the first group pixel array of the next frame is set to be the maximum of the EGP of the first group pixel array and the second group pixel array, the EGP of the second group pixel array for the next frame is set to be $$\min(R_0 * EGP_j, EGP_{max}),$$

and the compensation coefficient is set to be $$(M_{Y,target} - M_{Y[n]})/M_{[n]}$$

wherein $M_{Y,target}$ is the target image brightness, $M_{Y[n]}$ is the statistical value of the first group pixel array of the current frame and $M_{[n]}$ is the statistical mean of second group pixel array of the current frame.

19. The dual-exposure control method applied in the imaging system of claim 16, wherein the second control signal is arranged to control the gain of the first group pixel array and the exposure time of the first group pixel array, and the first control signal is arranged to control the gain of the second group pixel array and the exposure time of the second group pixel array.

20. The dual-exposure control method applied in the imaging system of claim 11, wherein the first group pixel array is composed of at least one of R, G, B colorful pixels and the second group pixel array is white pixel array, or the first group pixel array and the second group pixel array are two pixel arrays with different sensitivity, wherein the second group pixel array has the higher sensitivity than the first group pixel array does.

* * * * *